(12) United States Patent
Collier et al.

(10) Patent No.: US 10,031,838 B2
(45) Date of Patent: *Jul. 24, 2018

(54) PREDICTIVE APPROACH TO ENVIRONMENT PROVISIONING

(71) Applicant: International Business Machines Corporation, Armonk, NY (US)

(72) Inventors: Jason A. Collier, Cary, NC (US); David L. Leigh, Chapel Hill, NC (US); Yi-Hsiu Wei, Austin, TX (US); Scott A. Will, Louisburg, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/153,775

(22) Filed: May 13, 2016

(65) Prior Publication Data

US 2016/0253255 A1  Sep. 1, 2016

Related U.S. Application Data

(63) Continuation of application No. 14/714,432, filed on May 18, 2015, now Pat. No. 9,524,228, which is a
(Continued)

(51) Int. Cl.
*G06F 9/44* (2006.01)
*G06F 11/36* (2006.01)
(Continued)

(52) U.S. Cl.
CPC ............ *G06F 11/3664* (2013.01); *G06F 8/10* (2013.01); *G06F 8/71* (2013.01); *G06F 11/3696* (2013.01); *G06Q 10/063114* (2013.01)

(58) Field of Classification Search
None
See application file for complete search history.

(56) References Cited

U.S. PATENT DOCUMENTS 5,557,774 A * 9/1996 Shimabukuro ...... G01R 31/318357
703/21
7,451,207 B2  11/2008 Oliver
(Continued)

FOREIGN PATENT DOCUMENTS

WO  03084133 A1  10/2003

OTHER PUBLICATIONS

Collier et al., "Predictive Approach to Environment Provisioning", U.S. Appl. No. 15/280,194, filed Sep. 29, 2016, pp. 1-29.
(Continued)

*Primary Examiner* — Daxin Wu
(74) *Attorney, Agent, or Firm* — Brian M. Restauro

(57) ABSTRACT

Embodiments of the present invention provide methods, systems, and computer program products for building an environment. Embodiments of the present invention can be used to allocate resources and build an environment such that the environment is built when a user is prepared to test one or more portions of code in the environment. Embodiments of the present invention can be used to reduce the "lag time" developers experience between waiting for the code to be built and for resources to be provisioned, and can also provide a less costly alternative to maintaining and operating dedicated environments.

18 Claims, 5 Drawing Sheets

Related U.S. Application Data continuation of application No. 14/524,195, filed on Oct. 27, 2014, now Pat. No. 9,430,750.

(51) Int. Cl.
  *G06Q 10/06* (2012.01)
  *G06F 8/71* (2018.01)
  *G06F 8/10* (2018.01)

(56) References Cited

U.S. PATENT DOCUMENTS

| | | | | |
|---|---|---|---|---|
| 8,341,599 | B1* | 12/2012 | Angalet | G06F 9/44505 717/104 |
| 8,489,930 | B1* | 7/2013 | Sim-Tang | G06F 11/3664 714/38.1 |
| 8,661,431 | B2* | 2/2014 | Barthel | G06F 8/61 702/15 |
| 9,110,496 | B1 | 8/2015 | Michelsen | |
| 2003/0018514 | A1* | 1/2003 | Billet | G06Q 10/04 706/48 |
| 2006/0031813 | A1* | 2/2006 | Bishop | G06F 9/5077 717/102 |
| 2006/0190417 | A1* | 8/2006 | Hilkemeyer | G06Q 30/0206 705/400 |
| 2007/0022324 | A1 | 1/2007 | Chang et al. | |
| 2007/0283282 | A1* | 12/2007 | Bonfiglio | G06F 8/71 715/762 |
| 2008/0098385 | A1* | 4/2008 | Alger | G06F 9/44505 717/174 |
| 2008/0133442 | A1* | 6/2008 | Fischer | G06Q 10/04 706/47 |
| 2009/0029692 | A1 | 1/2009 | Radermacher et al. | |
| 2009/0106424 | A1* | 4/2009 | Safari | G06F 11/1433 709/226 |
| 2011/0258602 | A1 | 10/2011 | Ndem et al. | |
| 2011/0295643 | A1* | 12/2011 | Miller | G06Q 10/06 705/7.23 |
| 2012/0030685 | A1 | 2/2012 | Jackson | |
| 2012/0079497 | A1 | 3/2012 | Gangemi et al. | |
| 2013/0007710 | A1 | 1/2013 | Vedula et al. | |
| 2013/0058178 | A1 | 3/2013 | Lai et al. | |
| 2013/0138798 | A1 | 5/2013 | Gohad et al. | |
| 2013/0152047 | A1* | 6/2013 | Moorthi | G06F 11/368 717/124 |
| 2013/0305210 | A1* | 11/2013 | Sharma | G06Q 10/06 717/102 |
| 2014/0196051 | A1* | 7/2014 | Subramanya | G06F 9/50 718/104 |
| 2014/0229221 | A1* | 8/2014 | Shih | G06Q 10/06313 705/7.23 |
| 2015/0143327 | A1* | 5/2015 | Holmes | G06F 8/70 717/101 |
| 2015/0234890 | A1* | 8/2015 | Legrand | H04L 67/10 707/769 |
| 2015/0309922 | A1 | 10/2015 | Mansour et al. | |

OTHER PUBLICATIONS

IBM Appendix P.: "List of IBM Patents or Patent Applications to Be Treated As Related", Dated Sep. 29, 2016, 2 pages.

Appendix P List of IBM Patents or Patent Applications Treated As Related Dated May 12, 2016. Two Pages.

Collier et al. Original U.S. Appl. No. 14/524,195, filed Oct. 27, 2014.

Collier et al. Original U.S. Appl. No. 14/714,432, filed May 18, 2015.

* cited by examiner

PREDICTIVE APPROACH TO ENVIRONMENT PROVISIONING

FIELD OF THE INVENTION

The present invention relates generally to the field of test environments, and more particularly to provisioning resources for test environments.

BACKGROUND OF THE INVENTION

A computer software program needs to be evaluated to determine whether it achieves its particular or desired purpose. Generally, software testing is used to expose problems with the software to alert software engineers to debug the code in the software causing problems. Test environments are used to mimic the intended software and/or hardware environment in which the program will be deployed to ensure the program will perform its desired purpose for the end user.

Typically, after code is written for a software program, the software engineer must wait for the code to be "built". In the interim, the software engineer must build the software test environment to test the code and determine if it performs as desired. For example, a team of software engineers could use DevOps, a methodology of software development that helps an organization to rapidly produce software products and services, to provision resources for building test environments by selecting various pre-requisites and co-requisites that need to be installed to run the tests. Given the complexity of the environment, the provisioning could take hours to complete, and only then could the software engineers begin testing. Thus, software engineers can experience "lag time" between waiting for the code to be built and the creation of the test environment. In other instances, there could be dedicated environments already set up but are not being used.

SUMMARY

Embodiments of the present invention provide systems, methods, and program products for building an environment, such that the environment is built when the user is prepared to test the one or more portions of code in the environment. In one embodiment of the present invention, a method is provided comprising: identifying a coding task to be performed by a user involving one or more portions of code for a software program; identifying resources with which to build an environment for the coding task based, at least in part, on one or more areas of the software program associated with one or more portions of code; and calculating a time at which to start building the environment, such that the environment is built when the user is prepared to test the one or more portions of code in the environment.

DETAILED DESCRIPTION

Embodiments of the present invention recognize the need for ways to provide more efficient allocation of resources for building an environment. Embodiments of the present invention provide systems, methods, and computer program products for predicting a necessary environment and ensuring the environment is available to be used for testing when a developer's build is completed and ready to be tested. Accordingly, embodiments of the present invention can help reduce the "lag time" developers experience between waiting for the code to be built and for resources to be provisioned to build an environment to test one or more portions of code, and can provide a less costly alternative to maintaining and operating dedicated environments.

Figure 1:
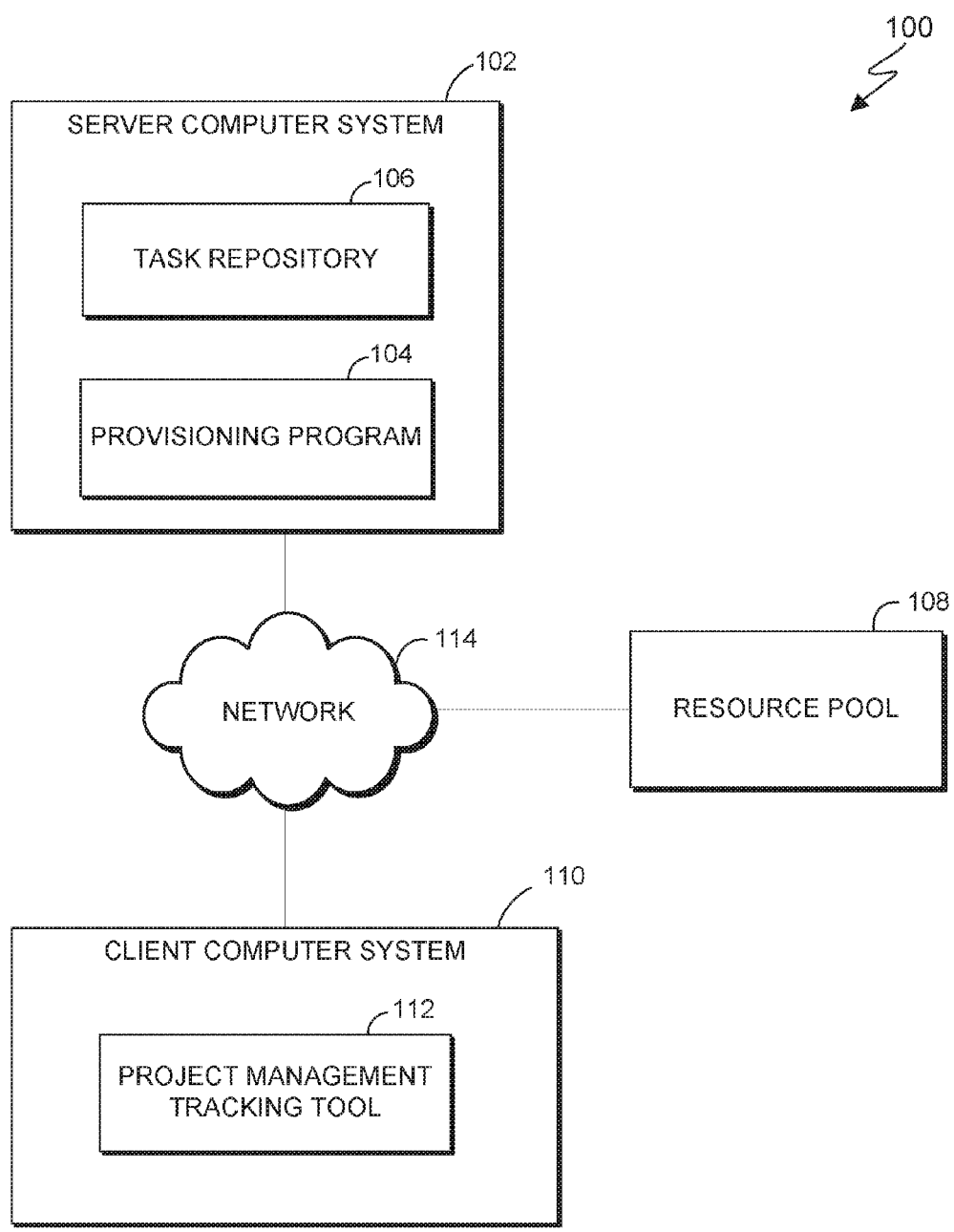
FIG. 1 is a functional block diagram illustrating a computing environment, in accordance with an embodiment of the present invention.

FIG. 1 is a functional block diagram of computing environment 100, in accordance with an embodiment of the present invention. Computing environment 100 includes server computer system 102 and client computer system 110. Server computer system 102 and client computer system 110 can be desktop computers, laptop computers, specialized computer servers, or any other computer systems known in the art. In certain embodiments, server computer system 102 and client computer system 110 represent computer systems utilizing clustered computers and components to act as a single pool of seamless resources when accessed through network 114. In general, server computer system 102 and client computer system 110 are representative of any electronic devices, or combination of electronic devices, capable of executing machine-readable program instructions, as described in greater detail with regard to FIG. 5.

Server computer system 102 includes provisioning program 104 and task repository 106. Provisioning program 104 monitors task repository 106, and allocates resources from resource pool 108 via network 114 to build environments for various coding tasks. Provisioning program 104 further calculates a time at which to start building environments for coding tasks, such that the environments are built when the user is prepared to test the one or more portions of code in the environments. The term "environment", as used herein, refers generally to an environment used to test code written for, and/or otherwise affected by, a coding task. An environment may be, for example, a test environment built specifically to test one or more portions of code, a staging environment (e.g., pre-production environment), and/or an actual production environment (i.e., where code is ultimately deployed and made available for use by end users).

Task repository 106 stores tasks received from project management tracking tool 112 via network 114. Task repository 106 can be implemented using any non-volatile storage media known in the art. For example, task repository 106 can be implemented with a tape library, optical library, one or more independent hard disk drives, or multiple hard disk drives in a redundant array of independent disks (RAID). Similarly, task repository 106 can be implemented with any suitable storage architecture known in the art, such as a relational database, an object-oriented database, and/or one or more tables.

Resource pool 108 comprises hardware and software resources to be allocated by provisioning program 104 when building an environment for a coding task. For example, resource pool 108 may comprise a plurality of computer systems with various software installed thereon, coupled to a plurality of databases and/or other devices. In general, resource pool 108 represents any hardware, software, and combinations thereof that may be provisioned for building an environment with which to test programming code written for, and/or otherwise affected by, one or more coding tasks. For example, resource pool 108 may include a plurality of web servers, client computer systems, and web browsers that can be provisioned to build environments to test program code of a web application.

Network 114 can be, for example, a local area network (LAN), a wide area network (WAN) such as the Internet, or a combination of the two, and include wired, wireless, or fiber optic connections. In general, network 114 can be any combination of connections and protocols that will support communications between server computer system 102, resource pool 108, and client computer system 110, in accordance with a desired embodiment of the invention.

Client computer system 110 includes project management tracking tool 112. Project management tracking tool 112 enables a user to create and define coding tasks. A coding task involves creation and/or modification of one or more portions of code of one or more software programs. Project management tracking tool 112 communicates with server computer system 102 via network 114 (e.g., using TCP/IP) to store task information in task repository 106. Task information describes one or more portions of a software program that needs to be created and/or modified. For example, project management tracking tool 112 can be implemented with any program that provides an integrated environment for creating and storing one or more coding tasks, monitoring its progress, and coordinating between one or more developer teams.

Figure 2:
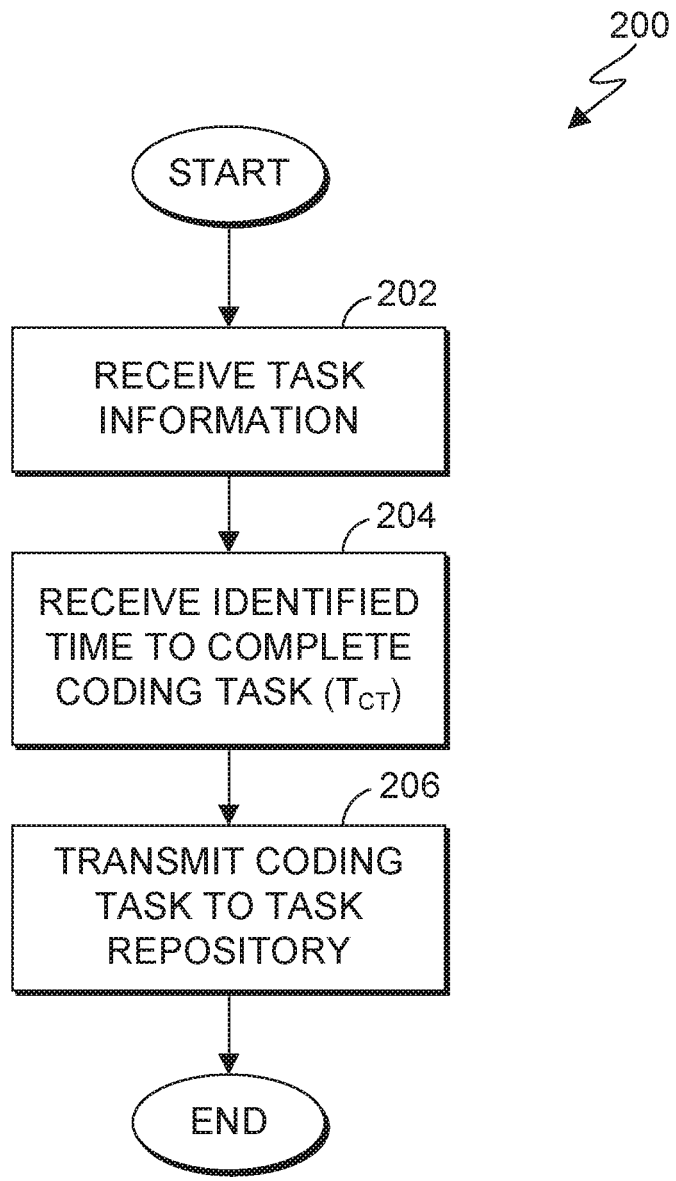
FIG. 2 is a flowchart illustrating operational steps for creating a coding task, in accordance with an embodiment of the present invention.

FIG. 2 is a flowchart 200 illustrating operational steps for creating a coding task, in accordance with an embodiment of the present invention.

In step 202, project management tracking tool 112 receives task information for the coding task being created. In this embodiment, task information is received from a user of client computer system 110. Task information comprises a title, a brief description of the coding task, what type of code needs to be written, areas of the software program affected by a coding task, and a default status of "not started". For example, the title of the coding task could be "Modification of Web Application Module". A brief description could specify that the module that allows access to a database is malfunctioning, while the area of the software program affected could indicate that the entire web application, the module that allows access to a database, and the servers that host the web application are areas affected by the coding task. The task information can further specify that code for the module needs to be rewritten or otherwise modified, and the time estimated to complete the coding task is 4 hours.

In step 204, project management tracking tool 112 receives the identified length of time to complete coding task ($T_{CT}$) for the coding task being created. $T_{CT}$ represents the length of time it takes to complete a coding task (i.e., 4 hours to complete writing code for a module to access a database). In this embodiment, $T_{CT}$ is received from a user of client computer system 110. For example, a user creating the coding task may specify an estimated time on the order of 4 hours, 8 hours, or 16 hours.

In step 206, project management tracking tool 112 creates and transmits the coding task to server computer system 102 via network 114 for storage in task repository 106. In this embodiment, after performing the operational steps of FIG. 2, a user responsible for completing the coding task can subsequently access the created coding task in task repository 106 to begin work on the coding task.

Figure 3:
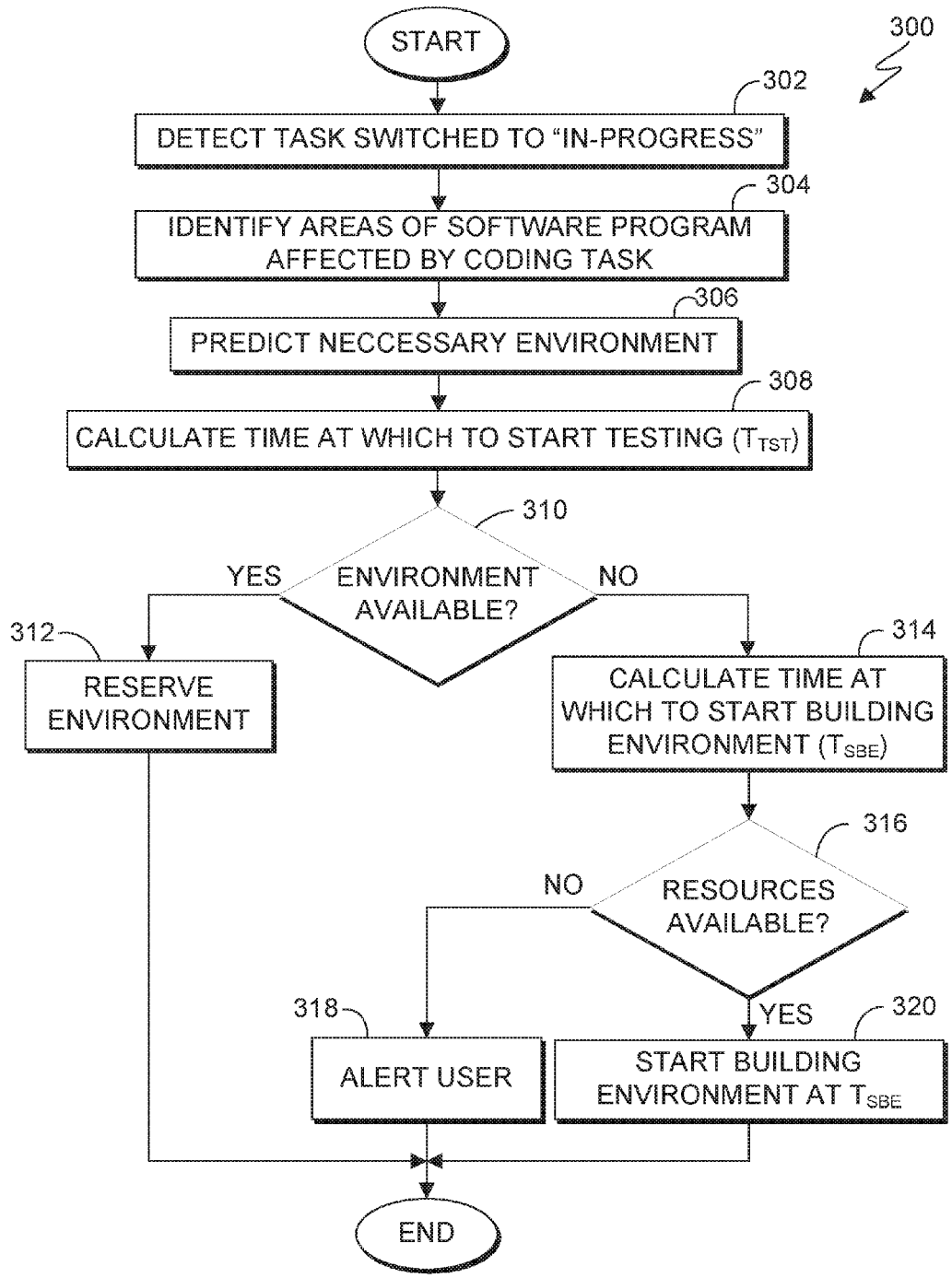
FIG. 3 is a flowchart illustrating operational steps for building an environment, in accordance with an embodiment of the present invention.

FIG. 3 is a flowchart 300 illustrating operational steps for building an environment for a coding task stored in task repository 106, in accordance with an embodiment of the present invention. For illustrative purposes, the following discussion is made with respect to a single example coding task and building of a test environment for the coding task, it being understood that the operational steps of FIG. 3 may be performed for a plurality of different coding tasks, and the environment built can be any desired type of environment.

In step 302, provisioning program 104 detects that a coding task stored in task repository 106 has changed to an "in-progress" status. In this embodiment, each coding task stored in task repository 106 is associated with a status that indicates it state. Statuses can include, "not started", "in-progress", and "completed". In this embodiment, provisioning program 104 queries task repository 106 pursuant to a schedule to determine whether any coding task statuses have changed from "not started" to "in-progress", which indicates that a user has begun work on a coding task. In alternative embodiments, provisioning program 104 can receive indications of status changes directly from another program, such as from project management tracking tool 112.

In step 304, provisioning program 104 identifies areas of the software program affected by the coding task. In this embodiment, provisioning program 104 identifies areas of the software program affected by the coding task by accessing task repository 106 and analyzing the task information for the coding task. As previously discussed, a user who created the coding task may have specified one or more affected areas of the software program which provisioning program 104 can identify in step 302. In addition, provisioning program 104 can analyze task information, such as the title and brief description of the coding task, to identify affected areas of the software program. For example, by analyzing a title of "Modification Web application Module" and a description specifying that the web application module must be modified such that it properly accesses a database, provisioning program 104 can identify areas of the software program affected by the coding task as including the web application module and other portions of code involved in accessing the subject database.

In step 306, provisioning program 104 predicts a necessary environment for the coding task. Predicting a necessary environment for a coding task involves identifying resources in a resource pool needed to create an environment for testing program code written for, and/or otherwise affected by the coding task. In this embodiment, provisioning program 104 accesses task repository 106 for the task description transmitted to task repository 106 to calculate the necessary environment based on the identified areas of the software program affected by the coding task. For example, where the coding task involves writing code for a web module that accesses a database, provisioning program 104 identifies that a plurality of servers are coupled to a database, and configures those resources with the necessary software, settings, and operational parameters that are needed to test the functionality of the web module. In alternative embodiments, provisioning program 104 could also predict the necessary environment based on any specific resources indicated by a user who created the coding task, or based on environments that have been historically needed for similar coding tasks, or any combination thereof.

In step 308, provisioning program 104 calculates a time at which to start testing ($T_{TST}$). $T_{TST}$ represents the predicted time when one or more portions of code will be ready for testing. In this embodiment, provisioning program 104 calculates $T_{TST}$ by adding an identified user start time ($T_{US}$) at which a user responsible for completing the coding task begins work on the coding task, an identified length of time it takes a user to complete a coding task ($T_{CT}$), and an identified length of time it takes for the code to be compiled into an executable program ($T_{BC}$). For example, provisioning program 104 might identify the values it needs as, $T_{US}$ to be 9:00 am, $T_{CT}$ to be 2 hours, and $T_{BC}$ to be 3 hours. Provisioning program 104 would then calculate $T_{TST}$ by adding the values for $T_{CT}$ and $T_{BC}$ (2 hours plus 3 hours), and adjusting $T_{US}$ (9:00 am) by 5 hours ($T_{CT}+T_{BC}$) to give a $T_{TST}$ of 2:00 pm.

In this embodiment, provisioning program 104 identifies $T_{US}$ as the time a user responsible for completing the coding task accesses the created coding task in task repository 106 to begin work on the coding task, which causes the coding task status to switch from "not started" to "in-progress". In alternative embodiments, provisioning program 104 can receive an indication from project management tracking tool 112 when the user begins work on the coding task and use that time as $T_{US}$. In other embodiments, provisioning program 104 could confirm $T_{US}$ with project management tracking tool 112 before proceeding. For example, provisioning program 104 could query project management tracking tool 112, which in turn prompts the user of project management tracking tool 112 to input $T_{US}$.

In this embodiment, provisioning program 104 identifies $T_{CT}$ as the length of time to complete the coding task by accessing stored task information in task repository 106 which contains a user identified length of time to complete coding task.

In this embodiment, provisioning program 104 uses historical data to identify $T_{BC}$. Historical data in this example could be the stored data from previous builds (i.e., how long it took to build a type of code). For example, provisioning program 104 uses historical data, and it indicates that it took 2 hours to build that code; then provisioning program 104 sets that value as $T_{BC}$.

In step 310, provisioning program 104 determines whether an environment for the coding task will be available for use (i.e., potentially obviating the need to build the predicted environment). An environment can be regarded as available for use if it is currently in use but will be available at $T_{TST}$ or within a specified amount of time from $T_{TST}$. An environment can also be regarded as available if it will be in use at $T_{TST}$ but can be simultaneously used to test the completed coding task. In this embodiment, provisioning program 104 accesses resource pool 108 to determine whether an environment will be available for use. For example, provisioning program 104 could access resource pool 108 and identify that a particular environment comprising the needed resources for the coding task is currently in use but will be available within five minutes after $T_{TST}$.

If, in step 310, provisioning program 104 determines an environment will be available for use, then, in step 312, provisioning program 104 reserves the environment for testing the one or more portions of program code for the completed coding task. In this embodiment, reserving the environment prevents allocated resources of the environment from being reallocated for other purposes, and also prevents the environment from being reserved by other applications. For example, provisioning program 104 may determine that a particular environment for a first coding task is already built and will be available for use at $T_{TST}$ for a second coding task. Provisioning program 104 would then prevent resources of that environment from being reallocated for other purposes, and also prevent that environment from being reserved by other applications.

If, in step 310, provisioning program 104 determines an environment is not available for use, then, in step 314, provisioning program 104 predicts a time at which to start building the environment for the coding task ($T_{SBE}$). In this embodiment, provisioning program 104 predicts $T_{SBE}$ by subtracting the identified length of time to build an environment ($T_{BE}$) which represents the identified length of time needed to identify and allocate resources in resource pool 108 and configure those resources to test one or more portions of program code written for, or otherwise affected by, the coding task from $T_{TST}$. For example, provisioning program 104 might identify TST as 2:00 pm and $T_{BE}$ as one hour. Provisioning program 104 would then calculate $T_{SBE}$ by adjusting TST (2:00 pm) by $T_{BE}$ (one hour) to yield a $T_{SBE}$ of 1:00 pm.

In this embodiment, provisioning program 104 uses historical data to identify $T_{BE}$. Historical data includes saved times for how long provisioning program 104 took to build environments for one or more previous similar coding tasks. For example, when identifying $T_{BE}$ for a coding task that called for a modification to a module for a web application, provisioning program 104 can check historical data to determine how long it previously took to provision resources to build similar environments and use that values as $T_{BE}$. Other embodiments can use other techniques, such as using preset values based on resources (e.g., preset of X minutes for each server that must be provisioned, and Y minutes for each database), and adding those values to arrive at $T_{BE}$. For example, provisioning program 104 might identify a server (preset value of 40 minutes to build) and a database (preset value of 20 minutes to build) are needed for the environment. Provisioning program 104 could then identify $T_{BE}$ by adding those values for a server and a database (40 minutes+ 20 minutes) to give $T_{BE}$ a value of 60 minutes.

In step 316, provisioning program 104 determines whether needed resources are available to build the environment for the coding task. In this embodiment, provisioning program 104 accesses resource pool 108 and checks whether the resources identified in step 306 will be available by $T_{SBE}$. For example, provisioning program 104 might predict that $T_{SBE}$ for a coding task is 1:00 pm. Provisioning program 104 would then access resource pool 108 and determine whether the needed resources will be available at 1:00 pm (e.g., needed resources will not be allocated for another environment at 1:00 pm, and/or needed resources will be allocated but can be shared).

If, in step 316, provisioning program 104 determines that needed resources are not available to build the environment for the coding task, then, in step 318, provisioning program 104 alerts the user. In this embodiment, the alert indicates that resources will not be available. Accordingly, a user could then decide to work on another task. In other embodiments, provisioning program 104 could identify tasks for which environments or resources would be available for testing if the task was started now. For example, provisioning program 104 could access task repository 106, identify the "not started" tasks, and perform the previously discussed steps as if the "not started" tasks were just started.

If, in step 316, provisioning program 104 determines that needed resources are available to build the environment for the coding task, then, in step 320, provisioning program 104 starts building the environment for the coding task at $T_{SBE}$. In this embodiment, provisioning program 104 builds the environment by provisioning and configuring resources for the coding task from resource pool 108 at $T_{SBE}$.

Accordingly, in this embodiment, provisioning program 104 starts building an environment for the coding task so that the environment is built and ready for testing by the time the coding task is completed. In some instances, provisioning program 104 may identify an existing environment that can be used for the coding task, obviating the need to build another environment. Thus, this embodiment can be used to provision resources from a resource pool in a more efficient way and reduce "lag time" developers experience while waiting for an environment to be built.

Figure 4:
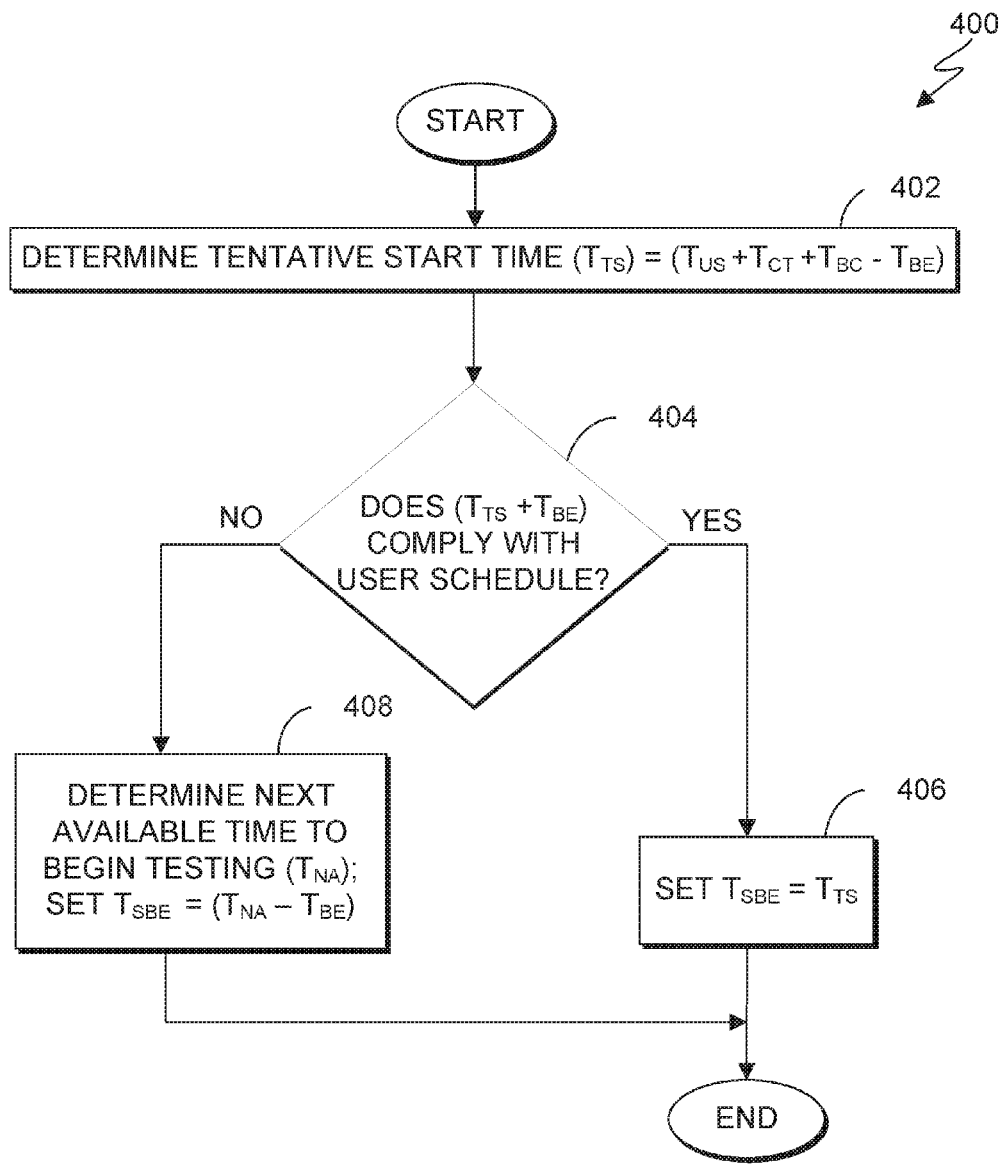
FIG. 4 is a flowchart illustrating operational steps for predicting a time at which to start building an environment, in accordance with an embodiment of the present invention.

FIG. 4 is a flowchart 400 illustrating operational steps for predicting a time at which to start building an environment, in accordance with an embodiment of the present invention. For example, operational steps of flowchart 400 can be performed at step 314 of flowchart 300. For illustrative purposes, the following discussion is made with respect to a single example coding task and building of a test environment for the coding task, it being understood that the operation steps of FIG. 4 may be performed for a plurality of different coding tasks, and the environment built can be any desired type of environment.

In step 402, provisioning program 104 calculates a tentative start time ($T_{TS}$), which is an initial calculation of a time to start building the environment. In this embodiment, provisioning program 104 uses $T_{US}$, $T_{CT}$, $T_{BC}$, and $T_{BE}$ as values to calculate $T_{TS}$. Provisioning program 104 calculates $T_{TS}$ by adjusting the value for $T_{US}$ by adding $T_{CT}$ and $T_{BC}$ and subtracting $T_{BE}$. For example, provisioning program 104 might identify the values it needs as $T_{US}$ to be 9:00 am, $T_{CT}$ to be 2 hours, and $T_{BC}$ to be 3 hours and $T_{BE}$ to be 4 hours. Provisioning program 104 would then calculate $T_{TS}$ by adding the values for $T_{CT}$ and $T_{BC}$ (2 hours plus 3 hours), subtracting that value by $T_{BE}$ (5 hours minus 4 hours) and adjusting $T_{US}$ (9:00 am) by 1 hour ($T_{CT}+T_{BC}-T_{BE}$) to give $T_{TS}$ value of 10:00 am. In alternative embodiments, provisioning program 104 could use other values to determine $T_{TS}$.

In step 404, provisioning program 104 determines whether ($T_{TS}+T_{BE}$) complies with a user's schedule. The value of ($T_{TS}+T_{BE}$) represents the time at which the environment would be finished being built (i.e., finished allocating and configuring necessary resources, such that code written for, or otherwise affected by, the coding task can be tested), if building the environment began at $T_{TS}$. A user's schedule represents the available times that a user can begin testing one or more portions of code using the built environment. In an alternative embodiment, provisioning program 104 identifies the user schedule from historical data which indicates times a user has previously been available to begin testing. For example, if provisioning program 104 determined ($T_{TS}+T_{BE}$) to be 2:00 pm, provisioning program 104 would compare whether the user schedule provided by historical data indicates that the user will be available to work at 2:00 pm. In alternative embodiments, provisioning program 104 could receive indications from project management tracking tool 112 for user schedules. Alternatively, provisioning program 104 could access user schedules from another program, such as a shared calendar program.

If, in step 404, provisioning program 104 determines that the value of ($T_{TS}+T_{BE}$) complies with a user's schedule, then, in step 406, provisioning program 104 sets $T_{TS}$ as the time to start building the environment ($T_{SBE}$). $T_{SBE}$ represents the predicted time to start building the environment so that the environment is ready for use when the user is available to begin testing.

If, in step 404, provisioning program 104 determines that ($T_{TS}+T_{BE}$) does not comply with a user's schedule, then, in step 408 provisioning program 104 determines a next available time to begin testing ($T_{NA}$), which is the earliest available time that the user can begin testing one or more portions of code using the built environment, and sets $T_{SBE}$ as ($T_{NA}-T_{BE}$). In this embodiment, provisioning program 104 identifies $T_{NA}$ using the same historical data and/or schedule that was checked in step 404 and sets that value as $T_{TS}$. For example, if a user consistently begins work at 9:00 am, provisioning program 104 can use that value as the earliest available time a user can begin testing one or more portions of code using the built environment. In alternative embodiments, provisioning program 104 prompts the user of project management tracking tool 112 to input earliest available time to start provisioning and sets that value as $T_{NA}$. Provisioning program 104 then subtracts the value for $T_{BE}$ from the value for $T_{NA}$ to and sets the resulting value as $T_{SBE}$. For example, if provisioning program 104 determined $T_{NA}$ to be 2:00 pm and $T_{BE}$ to be two hours, provisioning program adjusts $T_{NA}$ by subtracting two hours to yield a $T_{SBE}$ of 12:00 pm.

Accordingly, by performing the operational steps of FIG. 4, provisioning program 104 calculates $T_{SBE}$ for the coding task such that the environment is available to the user when the user and code are ready for testing; which, again, can reduce the "lag time" the user experiences between waiting for an environment to be built for testing programming code written for, and/or otherwise affected by the coding task. Provisioning program 104 can also calculate a $T_{SBE}$ for the coding task based on user availability such that the environment is not prepared too far in advance so as to create "lag time" for other users who might need those resources.

Figure 5:
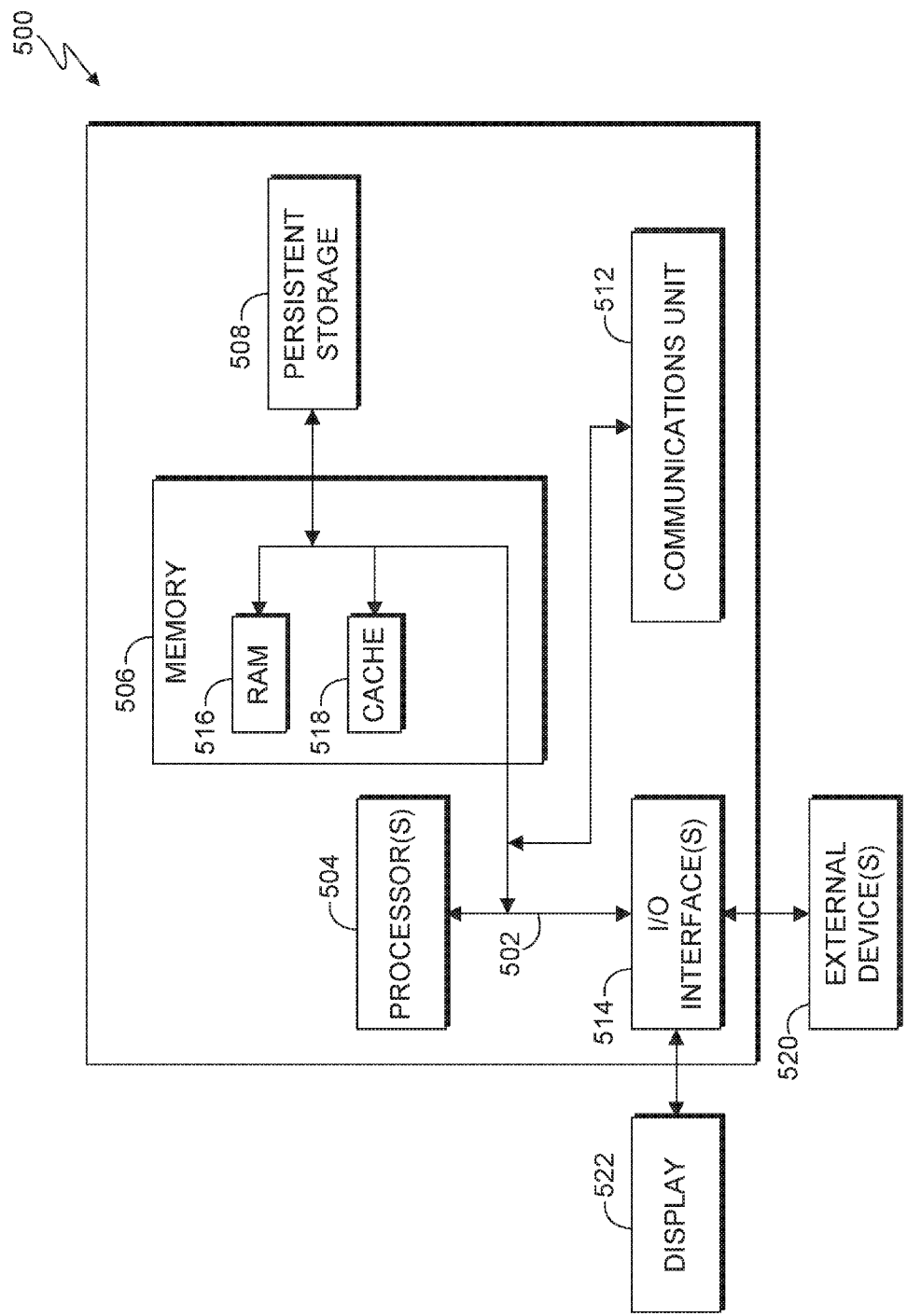
FIG. 5 is a block diagram of internal and external components of the computer systems of FIG. 1, in accordance with an embodiment of the present invention.

FIG. 5 depicts a block diagram of components of computer system 500 which is representative of the computer systems of FIG. 1, in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, table computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media.

Persistent storage 508 may include, for example, a plurality of a magnetic hard disk drives. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 512, in these examples, provides for communications with other data processing systems or devices via a (e.g., network 114). In this embodiment, communications unit 512 includes network adaptors or interfaces such as TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers, and/or edge servers. Software and data used to practice embodiments of the present invention can be downloaded to server computer system 102 through communications unit 512 (e.g., via the Internet, a local area network, or other wide area network). From communications unit 512, the software and data can be loaded onto persistent storage 508.

I/O interface(s) 514 allows for input and output of data with other devices that may be connected to server computer system 102. For example, I/O interface 514 may provide a connection to external devices 520 such as a keyboard, keypad, a touch screen, and/or some other suitable input device. External devices 520 can also include portable computer-readable storage media such as, for example, thumb drives, portable optical or magnetic disks, and memory cards. Software and data used to practice embodiments of the present invention, e.g., provisioning program 104, can be stored on such portable computer-readable storage media and can be loaded onto persistent storage 508 via I/O interface(s) 514. I/O interface(s) 514 also connect to a display 522.

Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for building a test environment, the method comprising:

identifying resources with which to build a test environment for a coding task involving one or more portions of code for a software program based, at least in part on one or more areas of the software program associated with the one or more portions of code, wherein the test environment to be built includes accommodations for testing one or more portions of code, replicating pre-production environments, and replicating an actual production environment;

predicting a time at which to start building the test environment such that the test environment is built and made available to a user by the time the user is prepared to test the one or more portions of code in the test environment, wherein predicting a time at which to start building the test environment such that the test environment is built and made available to a user by the time the user is prepared to test the one or more portions of code in a test environment comprises:

calculating a tentative start time by adding values for an identified length of time to perform any necessary builds of code and an identified length of time to complete the coding task to the identified start time at which the user began work on the coding task, and subtracting the identified length of time needed to build the test environment, determining whether the tentative start time complies with the time the user is prepared to test the one or more portions of code in the test environment; and responsive to determining that the tentative start time complies with the time the user is prepared to test the one or more portions of code in the test environment, building the test environment such that the test environment is built and made available to the user by the time the user is prepared to test the one or more portions of code in the test environment at the predicted time.

2. The computer-implemented method of claim 1, further comprising:

determining whether an existing test environment will be available for testing the one or more portions of code when the user is prepared to test the one or more portions of code.

3. The computer-implemented method of claim 1, further comprising:

determining whether resources will be available for building the test environment at the predicted time at which to start building the test environment, such that the test environment is built and made available to the user by the time the user is prepared to test the one or more portions of code in the test environment; and responsive to determining resources will not be available for building the test environment, at the predicted time at which to start building the test environment, such that the test environment is built and made available to the user by the time the user is prepared to test the one or more portions of code in the test environment, alerting the user.

4. The computer-implemented method of claim 1, wherein identifying resources with which to build a test environment for a coding task comprises:

accessing a task repository containing task information associated with the coding task; and determining a user has begun work on the coding task, wherein the task information comprises:

a title of the coding task, a brief description of the coding task, information that describes one or more areas of the software program affected by the coding task, an estimated time to complete the coding task, and a status indicating a progress state of the coding task.

5. The computer-implemented method of claim 4 further comprising:

accessing a pool of resources;

identifying resources associated with terms found in the task information; and identifying resources that have historically been used to build test environments for similar coding tasks.

6. The computer-implemented method of claim 1, wherein predicting a time at which to start building the test environment such that the test environment is built and made available to a user by the time a user is prepared to test the one or more portions of code in the test environment comprises:

calculating a time at which to start building the test environment based, at least in part, on an identified length of time to perform any necessary builds of code, an identified length of time to complete the coding task, an identified start time at which the user began work on the coding task, and an identified length of time needed to build the environment, wherein the identified length of time needed to build the test environment comprises a total length of time needed to allocate the identified resources from a resource pool and configure those resources into a test environment for the coding task.

7. A computer program product for building a test environment, the computer program product comprising:

one or more computer readable storage media and program instructions stored on the one or more computer readable storage media, the program instructions comprising:

program instructions to identify resources with which to build a test environment for a coding task involving one or more portions of code for a software program based, at least in part on one or more areas of the software program associated with the one or more portions of code, wherein the test environment to be built includes accommodations for testing one or more portions of code, replicating pre-production environments, and replicating an actual production environment;

program instructions to predict a time at which to start building the test environment such that the test environment is built and made available to a user by the time the user is prepared to test the one or more portions of code in the test environment, wherein predicting a time at which to start building the test environment such that the test environment is built and made available to a user by the time the user is prepared to test the one or more portions of code in a test environment comprises:

program instructions to calculate a tentative start time by adding values for an identified length of time to perform any necessary builds of code and an identified length of time to complete the coding task to the identified start time at which the user began work on the coding task, and subtracting the identified length of time needed to build the test environment, program instructions to determine whether the tentative start time complies with the time the user is prepared to test the one or more portions of code in the test environment; and program instructions to build the test environment such that the test environment is built and made available to the user by the time the user is prepared to test the one or more portions of code in the test environment at the predicted time.

8. The computer program product of claim 7, wherein the program instructions stored on the one or more computer readable storage media further comprise:

program instructions to determine whether an existing test environment will be available for testing the one or more portions of code when the user is prepared to test the one or more portions of code.

9. The computer program product of claim 7, wherein the program instructions stored on the one or more computer readable storage media further comprise:

program instructions to determine whether resources will be available for building the test environment at the predicted time at which to start building the test environment, such that the test environment is built and made available to the user by the time the user is prepared to test the one or more portions of code in the test environment; and program instructions to, responsive to determining resources will not be available for building the test environment, at the predicted time at which to start building the test environment, such that the test environment is built and made available to the user by the time the user is prepared to test the one or more portions of code in the test environment, alert the user.

10. The computer program product of claim 7, wherein the program instructions to identify resources with which to build a test environment for a coding task comprise:

program instructions to access a task repository containing task information associated with the coding task; and program instructions to determine a user has begun work on the coding task, wherein the task information comprises:

a title of the coding task, a brief description of the coding task, information that describes one or more areas of the software program affected by the coding task, an estimated time to complete the coding task, and a status indicating a progress state of the coding task.

11. The computer program product of claim 10, wherein the program instructions stored on the one or more computer readable storage media further comprise:

program instructions to access a pool of resources;

program instructions to identify resources associated with terms found in the task information; and program instructions to identify resources that have historically been used to build test environments for similar coding tasks.

12. The computer program product of claim 7, wherein the program instructions to predict a time at which to start building the test environment such that the test environment is built and made available to a user by the time a user is prepared to test the one or more portions of code in the test environment comprise:

program instructions to calculate a time at which to start building the test environment based, at least in part, on an identified length of time to perform any necessary builds of code, an identified length of time to complete the coding task, an identified start time at which the user began work on the coding task, and an identified length of time needed to build the environment, wherein the identified length of time needed to build the test environment comprises a total length of time needed to allocate the identified resources from a resource pool and configure those resources into a test environment for the coding task.

13. A computer system for building a test environment, the computer system comprising:

one or more computer processors;
one or more computer readable storage media; and
program instructions stored on the one or more computer readable storage media for execution by at least one of the one or more computer processors, the program instructions comprising:

program instructions to identify resources with which to build a test environment for a coding task involving one or more portions of code for a software program based, at least in part on one or more areas of the software program associated with the one or more portions of code, wherein the test environment to be built includes accommodations for testing one or more portions of code, replicating pre-production environments, and replicating an actual production environment;

program instructions to predict a time at which to start building the test environment such that the test environment is built and made available to a user by the time the user is prepared to test the one or more portions of code in the test environment, wherein predicting a time at which to start building the test environment such that the test environment is built and made available to a user by the time the user is prepared to test the one or more portions of code in a test environment comprises:

program instructions to calculate a tentative start time by adding values for an identified length of time to perform any necessary builds of code and an identified length of time to complete the coding task to the identified start time at which the user began work on the coding task, and subtracting the identified length of time needed to build the test environment, program instructions to determine whether the tentative start time complies with the time the user is prepared to test the one or more portions of code in the test environment; and program instructions to build the test environment such that the test environment is built and made available to the user by the time the user is prepared to test the one or more portions of code in the test environment at the predicted time.

14. The computer system of claim 13, wherein the program instructions stored on the one or more computer readable storage media further comprise:

program instructions to determine whether an existing test environment will be available for testing the one or more portions of code when the user is prepared to test the one or more portions of code.

15. The computer system of claim 13, wherein the program instructions stored on the one or more computer readable storage media further comprise:

program instructions to determine whether resources will be available for building the test environment at the predicted time at which to start building the test environment, such that the test environment is built and made available to the user by the time the user is prepared to test the one or more portions of code in the test environment; and program instructions to, responsive to determining resources will not be available for building the test environment, at the predicted time at which to start building the test environment, such that the test environment is built and made available to the user by the time the user is prepared to test the one or more portions of code in the test environment, alert the user.

16. The computer system of claim 13, wherein the program instructions to identify resources with which to build a test environment for a coding task comprise:

program instructions to access a task repository containing task information associated with the coding task; and program instructions to determine a user has begun work on the coding task, wherein the task information comprises:

a title of the coding task, a brief description of the coding task, information that describes one or more areas of the software program affected by the coding task, an estimated time to complete the coding task, and a status indicating a progress state of the coding task.

17. The computer system of claim 16, wherein the program instructions stored on the one or more computer readable storage media further comprise:

program instructions to access a pool of resources;
program instructions to identify resources associated with terms found in the task information; and
program instructions to identify resources that have historically been used to build test environments for similar coding tasks.

18. The computer system of claim 13, wherein the program instructions to predict a time at which to start building the test environment such that the test environment is built and made available to a user by the time a user is prepared to test the one or more portions of code in the test environment comprise:

program instructions to calculate a time at which to start building the test environment based, at least in part, on an identified length of time to perform any necessary builds of code, an identified length of time to complete the coding task, an identified start time at which the user began work on the coding task, and an identified length of time needed to build the environment, wherein the identified length of time needed to build the test environment comprises a total length of time needed to allocate the identified resources from a resource pool and configure those resources into a test environment for the coding task.

* * * * *